United States Patent
Lee et al.

(10) Patent No.: US 10,589,465 B2
(45) Date of Patent: Mar. 17, 2020

(54) TERMINAL APPARATUS, SYSTEM COMPRISING TERMINAL APPARATUS, AND METHOD FOR CONTROLLING TERMINAL APPARATUS

(71) Applicant: LG ELECTRONICS INC., Seoul (KR)

(72) Inventors: Doyoung Lee, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 438 days.

(21) Appl. No.: 15/503,322

(22) PCT Filed: Aug. 13, 2014

(86) PCT No.: PCT/KR2014/007526
§ 371 (c)(1),
(2) Date: Feb. 10, 2017

(87) PCT Pub. No.: WO2016/024649
PCT Pub. Date: Feb. 18, 2016

(65) Prior Publication Data
US 2017/0225400 A1 Aug. 10, 2017

(51) Int. Cl.
*B29C 64/386* (2017.01)
*G06T 19/20* (2011.01)
(Continued)

(52) U.S. Cl.
CPC ........ *B29C 64/386* (2017.08); *B29C 37/0025* (2013.01); *B29C 73/24* (2013.01);
(Continued)

(58) Field of Classification Search
CPC .... B29C 64/393; B29C 64/386; B29C 64/379
See application file for complete search history.

(56) References Cited

U.S. PATENT DOCUMENTS

| 2010/0328311 | A1 | 12/2010 | Lakshmanan et al. |
| 2014/0201022 | A1 | 7/2014 | Balzer |
| 2015/0054195 | A1* | 2/2015 | Greyf .................... B29C 64/165 264/250 |

FOREIGN PATENT DOCUMENTS

| KR | 1020090042678 | 4/2009 |
| WO | 2013060563 | 5/2013 |

OTHER PUBLICATIONS

PCT International Application No. PCT/KR2014/007526, Written Opinion of the International Searching Authority dated Apr. 20, 2015, 14 pages.
(Continued)

*Primary Examiner* — Timothy Kennedy
(74) *Attorney, Agent, or Firm* — Lee, Hong, Degerman, Kang & Waimey

(57) ABSTRACT

Disclosed are a terminal apparatus, a system comprising the terminal apparatus, and a method for controlling the terminal apparatus. The terminal apparatus comprises: an input unit for receiving 3D scanning information of an object; a display unit for displaying the 3D scanning information; and a control unit for detecting a defective part from the 3S scanning information, wherein if a defective part is detected, the control unit activates a repair mode, generates a repair part corresponding to the defective part on the basis of the 3D scanning information, and wherein the repair part is divided into a coupling area and a non-coupling area, and if a predetermined condition is satisfied, a separable protrusion can be formed in the non-coupling area.

18 Claims, 12 Drawing Sheets

(51) Int. Cl.
  *B33Y 50/02*  (2015.01)
  *B29C 37/00*  (2006.01)
  *B29C 73/24*  (2006.01)
(52) U.S. Cl.
  CPC .............. *B33Y 50/02* (2014.12); *G06T 19/20* (2013.01); *G06T 2219/2021* (2013.01)

(56) References Cited

OTHER PUBLICATIONS

8 Days a Week, "3D Printing and Industrial Scanning," Google Search, Jan. 29, 2014, 2 pages.

\* cited by examiner

FIG. 3
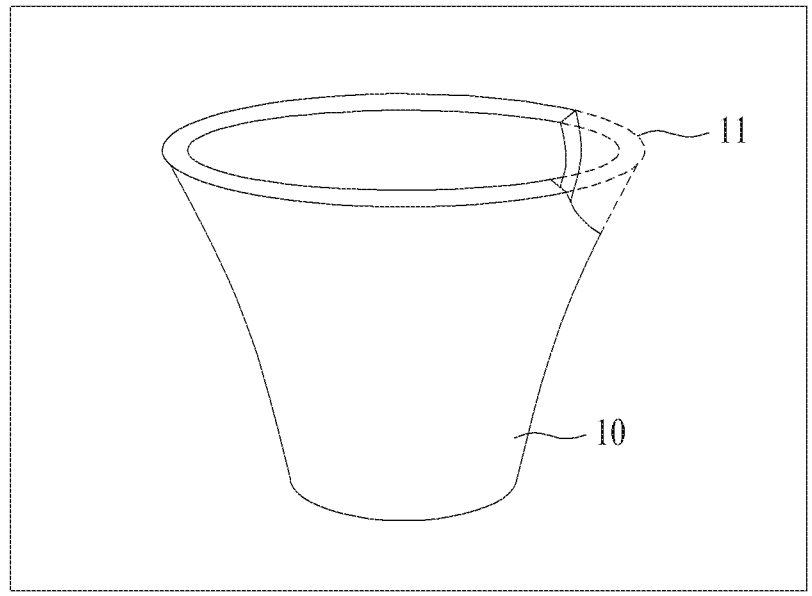
(1)
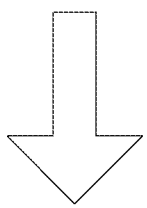
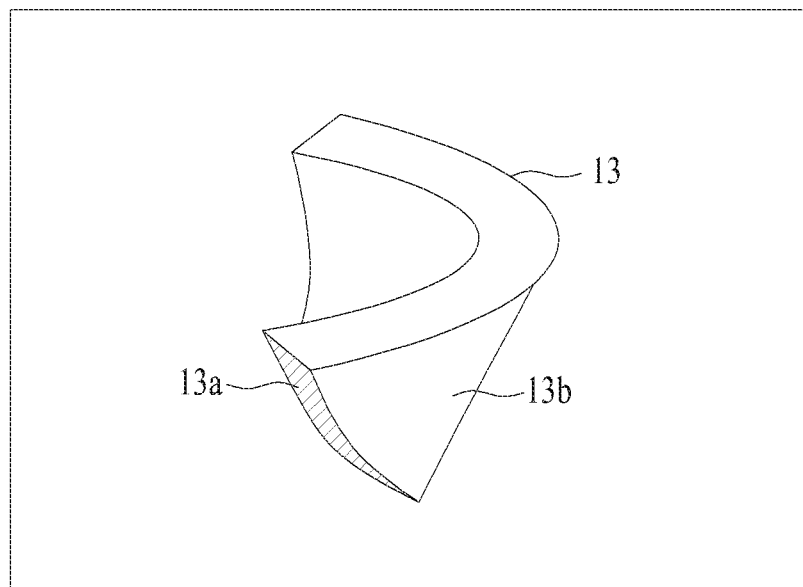
(2)

FIG. 6
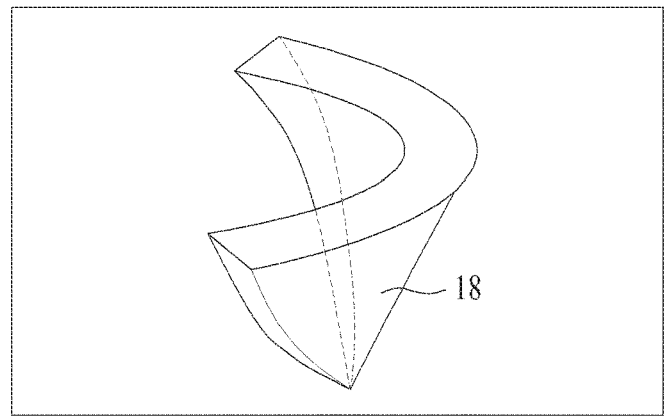
(1)
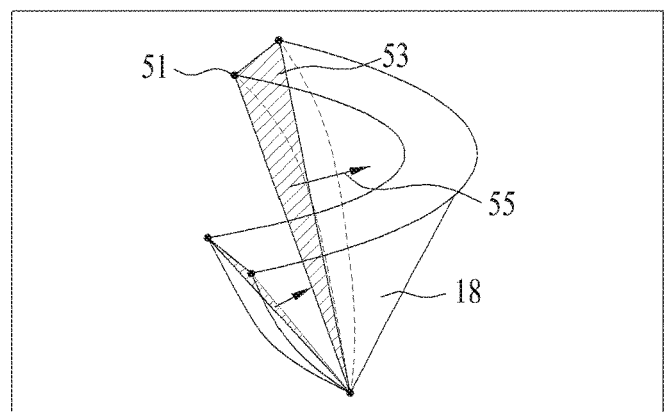
(2)
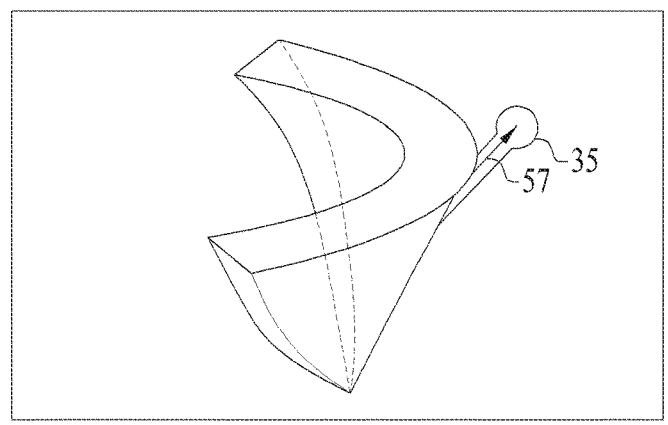
(3)

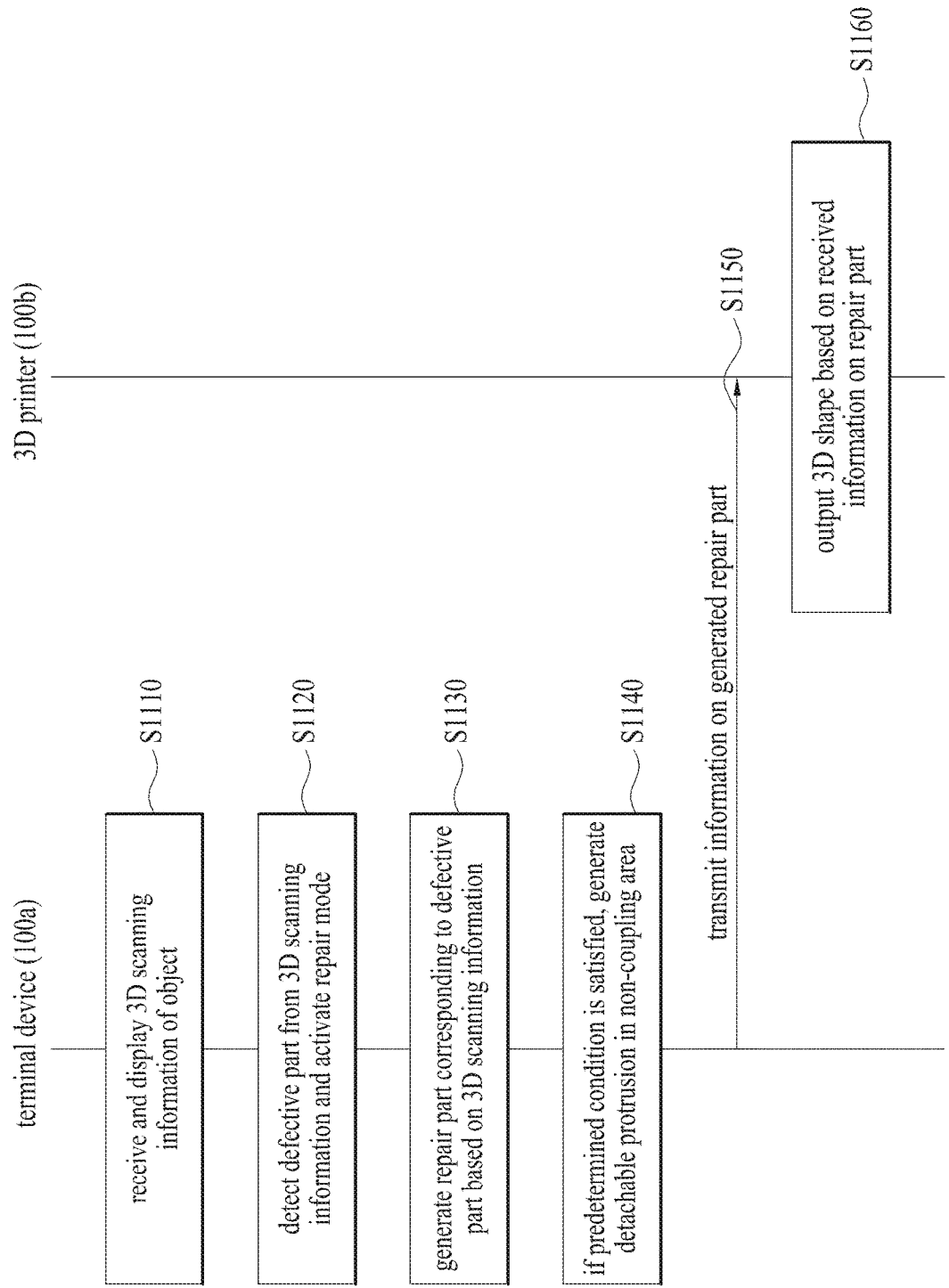

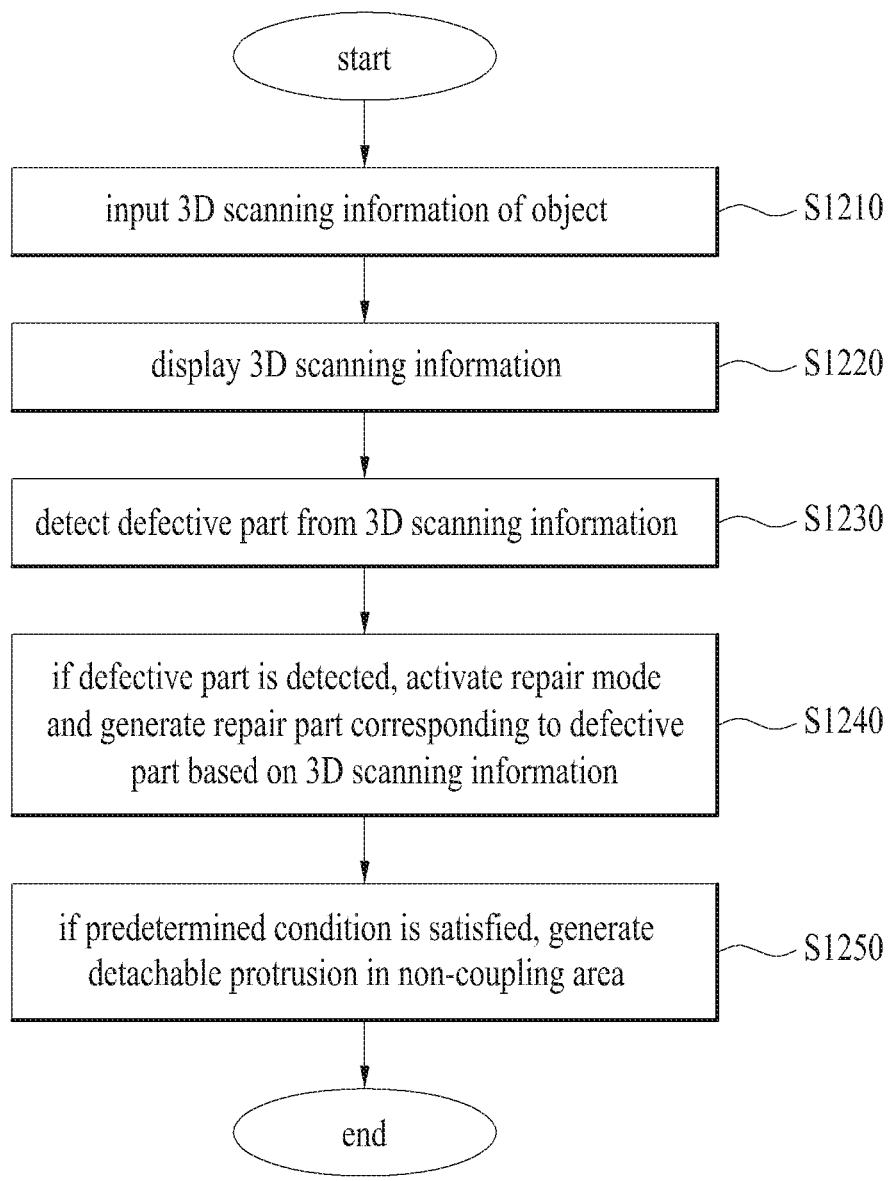

TERMINAL APPARATUS, SYSTEM COMPRISING TERMINAL APPARATUS, AND METHOD FOR CONTROLLING TERMINAL APPARATUS

CROSS-REFERENCE TO RELATED APPLICATIONS

This application is the National Stage filing under 35 U.S.C. 371 of International Application No. PCT/KR2014/007526, filed on Aug. 13, 2014, the contents of which are all hereby incorporated by reference herein in its entirety.

TECHNICAL FIELD

The present specification relates to a terminal device, a system including the terminal device, and a method of controlling the terminal device.

BACKGROUND ART

In accordance with the development of electronic and communication technologies, various terminal devices are developing. Terminal devices can be classified into a portable terminal device such as a smartphone, a tablet PC, and the like and a terminal device outputting a text or images received from an external device on a paper and the like such as a printer.

A printer in the past used to perform a function of outputting a text or an image on a plane. Yet, along with the advent of a 3D printer, it enables a user to print an object of a three-dimensional shape. The 3D printer receives information of a 3D shape and may be able to print the 3D shape in a manner of stacking a liquid material according to the information of the 3D shape or print the 3D shape in a manner of etching a solid material according to the information of the 3D shape.

Since the 3D printer prints a 3D shape in accordance with received information, if the received information includes a defective part, the 3D printer prints a 3D shape in which the defective part exists. In order to make the 3D printer print the defective part, it is necessary for a user to separately transmit information on the defective part to the 3D printer.

Hence, if there is no information on a defective part, it is unable to perform 3D printing on the defective part. And, in most cases, a defective part has a size or a shape which is difficult or inconvenient to be held by one hand. For example, a piece of broken pottery may correspond to a tiny piece. Therefore, it may be necessary to have a technology for generating a protrusion to be temporarily used as a handle rather than a defective part.

DISCLOSURE OF THE INVENTION

Technical Task

The present specification is designed to solve the aforementioned problem. An object of the present specification is to provide a terminal device capable of conveniently generating a defective part of a 3D object, a system including the terminal device, and a method of controlling the terminal device.

Technical Solution

To achieve these and other advantages and in accordance with the purpose of the present invention, as embodied and broadly described, according to one embodiment, a terminal device includes an input unit configured to receive an input of 3D scanning information of an object, a display unit configured to display the 3D scanning information, and a controller configured to detect a defective part from the 3D scanning information, the controller, if the defective part is detected, configured to activate a repair mode, the controller configured to generate a repair part corresponding to the defective part based on the 3D scanning information, wherein the repair part is classified into a coupling area and a non-coupling area, the controller, if a predetermined condition is satisfied, configured to generate a detachable protrusion in the non-coupling area.

Preferably, the predetermined condition may correspond to at least one selected from the group consisting of a condition that a volume of the repair part is equal to or less than a predetermined volume, a condition that the volume of the repair part is equal to or greater than the predetermined volume, a condition that a bending radius of the repair part is equal to or greater than a predetermined size, and a condition that a thickness of the repair part is equal to less than a predetermined size.

Preferably, if the volume of the repair part is equal to or greater than the predetermined volume, the controller can generate a plurality of protrusions.

Preferably, a plurality of the protrusions can maintain a predetermined distance among a plurality of the protrusions.

Preferably, the non-coupling area may correspond to an area of the object exposed to the external.

Preferably, the coupling area may correspond to an area contacted and engaged with one area of the defective area of the object.

Meanwhile, the controller can generate an adhesive application area in the coupling area.

Preferably, the controller can change a type of adhesive depending on a material of the repair part.

Preferably, the controller can detect at least one or more feature sides in a manner of detecting feature points and connecting the feature points with each other, detect vertical lines of the at least one or more feature sides, detect an average direction of the at least one or more detected vertical lines, and determine a point at which the detected average direction and the non-coupling area are met as a position at which the protrusion is generated.

Preferably, the controller can determine the detected average direction as a direction for which the protrusion is generated.

Preferably, if one side of the non-coupling area is equal to or greater than a predetermined size, the controller can determine the one side of the non-coupling area as a position at which the protrusion is generated.

Preferably, the controller can determine a vertical direction of the one side of the non-coupling area as a direction for which the protrusion is generated.

Preferably, the controller can generate the protrusion with a predetermined size irrespective of a size of the repair part.

Meanwhile, the protrusion can include a connection part and a handle part.

Preferably, the connection part is connected with the handle part and the repair part, and an area of the connection part connected with the repair part can be processed by bore-hole treatment or a thickness thinner than a thickness of other area of the connection part to make the connection part to be easily separated from the repair part.

Preferably, the handle part can be generated in a ring shape or processed by a non-skid treatment.

Meanwhile, the non-skid treatment can include at least one selected from the group consisting of a pattern treatment, an abrasion treatment, and a heterogeneous particle application treatment.

Meanwhile, the terminal device can further include an output unit configured to output a three dimensional shape of the repair part generated by the controller.

To further achieve these and other advantages and in accordance with the purpose of the present invention, according to a different embodiment, a system includes a terminal device configured to receive an input of 3D scanning information of an object and display the 3D scanning information of the object, the terminal device configured to activate a repair mode by detecting a defective part from the 3D scanning information, the terminal device configured to generate a repair part corresponding to the defective part based on the 3D scanning information, wherein the repair part is classified into a coupling area and a non-coupling area, the terminal device, if a predetermined condition is satisfied, configured to generate a detachable protrusion in the non-coupling area, the terminal device configured to transmit information on the generated repair part to the 3D printer, and a 3D printer configured to output a three dimensional shape based on the information on the repair part received from the terminal device.

To further achieve these and other advantages and in accordance with the purpose of the present invention, according to a further different embodiment, a method of controlling a terminal device, includes the steps of receiving an input of 3D scanning information of an object, displaying the 3D scanning information, detecting a defective part from the 3D scanning information, if the defective part is detected, activating a repair mode and generating a repair part corresponding to the defective part based on the 3D scanning information, wherein the repair part is classified into a coupling area and a non-coupling area, and if a predetermined condition is satisfied, generating a detachable protrusion in the non-coupling area.

Advantageous Effects

According to the aforementioned various embodiments, a terminal device, a system including the terminal device, and a method of controlling the terminal device can provide data on a repair part corresponding to a defective part of a 3D shape.

And, a terminal device, a system including the terminal device, and a method of controlling the terminal device can generate a protrusion capable of easily handling a repair part.

And, a terminal device, a system including the terminal device, and a method of controlling the terminal device can provide data related to application of an adhesive material to make a repair part to be attached to a defective part of a 3D shape.

DESCRIPTION OF DRAWINGS

FIG. 3 is a diagram for explaining a repair mode according to one embodiment;

FIG. 6 is a diagram for explaining one embodiment of configuring a direction of a protrusion;

FIG. 11 is a flowchart for explaining a procedure of transmitting and receiving data between an external terminal device and a 3D printer according to one embodiment;

FIG. 12 is a flowchart for a method of controlling a terminal device according to one embodiment.

BEST MODE

Figure 1:
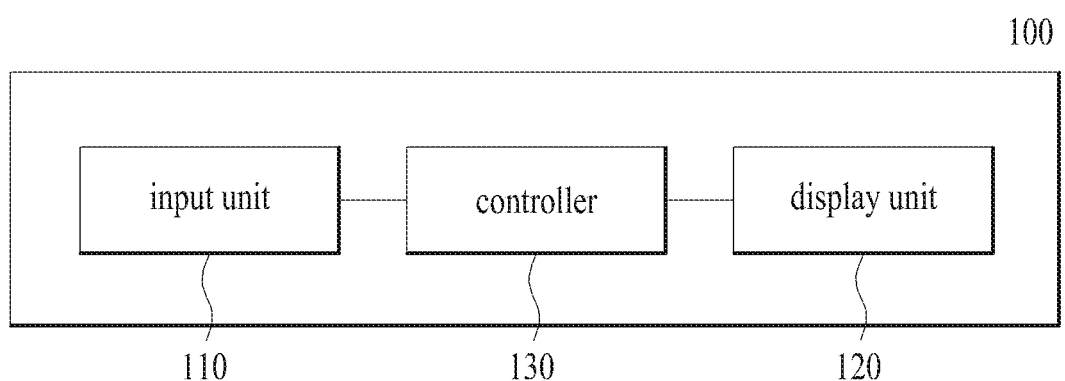
FIG. 1 is a block diagram for a terminal device according to one embodiment.

Reference will now be made in detail to the preferred embodiments of the present invention, examples of which are illustrated in the accompanying drawings. In this case, configurations and actions of the present specification shown in the drawings and explained by the drawings are explained as at least one embodiment, by which the technical idea, the core configuration, and action of the present specification may be non-limited.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

FIG. 1 is a block diagram for a terminal device according to one embodiment.

Referring to FIG. 1, a terminal device 100 can include an input unit 110, a display unit 120, and a controller 130.

The input unit 110 can receive an input of 3D scanning information of an object. The object means an object. The 3D scanning information of the object may correspond to information of the object scanned in three dimensions. Or, the 3D scanning information of the object may correspond to information that one plane of the object is scanned and a 3D shape of the object is calculated using information on a plurality of scanned planes. As one embodiment, the input unit 110 can be implemented by such a means as a keyboard, a mouse, a touchpad, and the like or can be implemented in such a form as a wired/wireless communication means, a memory card terminal, a flash memory terminal, a USB memory terminal, and the like.

For example, the terminal device 100 can receive an input of 3D scanning information of an object stored in an external device through a wired/wireless communication means. Or, the terminal device 100 can receive 3D scanning information of an object stored in an external memory through an input terminal.

The display unit 120 can display 3D scanning information. The display unit 120 can display various user menus and the like. The display unit 120 displays a screen including a touch recognition layer capable of receiving a touch input and may be then able to receive an input of a user on the displayed screen. And, if a repair mode is activated, the display unit 120 can display a repair part.

The controller 130 can detect a defective part from the 3D scanning information. The defective part corresponds to a damaged part or a broken part of the object. Although the object may exist in a perfect shape, the object may include a defective part that a partial area of the object is broken or damaged. For example, an excavated relic may exist in an imperfect shape. A dropped glass cup may exist in a state that a part of the glass cup is broken. As mentioned above, if an object including a defective part is scanned, 3D scanning information of the object may include a defective part.

If a defective part is detected from an object, the controller 130 can activate a repair mode. The repair mode corresponds to a mode for generating a repair part corresponding to the defective part to make the object have a perfect shape. In particular, the repair mode corresponds to a mode for generating a part corresponding to the defective part of the object. If a defective part is detected from inputted 3D scanning information, the controller 130 can automatically switch to the repair mode. Or, if a defective part is detected, the controller 130 may inquire of a user about whether to switch to the repair mode.

The controller 130 can generate a repair part corresponding to a defective part based on the 3D scanning information. If a repair mode is activated, the controller 130 can generate the repair part. As one embodiment, the controller 130 extracts information such as a position, a size, a shape, and the like of the defective part based on the 3D scanning information. The controller 130 can generate a repair part based on the extracted position, the size, the shape, and the like of the defective part. Or, the controller 130 can anticipate 3D information of the object of a perfect shape based on the 3D scanning information. The controller 130 compares the anticipated 3D information of the object of the perfect shape with the scanned object information to calculate and generate a repair part.

A repair part can be divided into a coupling area and a non-coupling area. The coupling area corresponds to an area directly contacted with a scanned object. In particular, the coupling area may correspond to at least one side of the repair part. And, since a cross section of a defective part of an object is uneven in general, the coupling area can be implemented by a bumpy surface. The non-coupling area corresponds to an area not directly contacted with a scanned object. The non-coupling area may include a surface exposed to the external.

It may keep a repair part in a manner of being separated from an object. And, it may be able to keep the repair part as a part of the object by combining the repair part with a defective part of the object. Meanwhile, the repair part may have a small size or an atypical shape. When a user combines the repair part with the object, it may be inconvenient for the user to directly hold the repair part by hand and it may be difficult to combine the repair part with the object. Hence, if a predetermined condition is satisfied, the controller 130 can generate a detachable protrusion in the non-coupling area. As one embodiment, the predetermined condition may correspond to one selected from the group consisting of a condition that a volume of a repair part is equal to or less than a predetermined volume, a condition that a volume of a repair part is equal to or greater than a predetermined volume, a condition that a bending radius of a repair part is equal to or greater than a predetermined size, a condition that a thickness of a repair part is equal to less than a predetermined size, and the like. Or, a plurality of conditions can be configured as a condition for generating a protrusion.

A protrusion corresponds to a part for handling a repair part handled by a user using a hand of the user. The protrusion can include a handle part and a connection part. For example, a user holds the protrusion by hand and may be able to insert a repair part to a defective part of an object. Hence, the protrusion can be generated in a non-coupling area. As mentioned in the foregoing description, this is because a coupling area is contacted with a defective part of the object.

A protrusion is not a part existing at an object but a part temporarily generated to easily handle a repair part of a prescribed condition. Hence, if the repair part is matched with the defective part of the object, the protrusion is not necessary. Hence, the protrusion can be eliminated. In order to easily eliminate the protrusion, special treatment can be performed on a connection part. For example, bore-hole treatment can be performed on the connection part to make the protrusion to be easily separated. Or, the connection part can be treated by a very thin thickness compared to other areas. When the connection part is processed by a special treatment, if a little gentle power is applied to the protrusion, the protrusion can be easily separated from the repair part. And, in order to make the repair part to be fixed in accordance with the defective part of the object, it may be able to generate an adhesive application area in a coupling area of the repair part. The adhesive application area corresponds to an area to which adhesive is applied and can be contacted with the defective part of the object. The repair part and the defective part of the object can be fixed by the adhesive.

The terminal device 100 can further include a different configuration part or can be divided into detail configuration parts.

Figure 2:
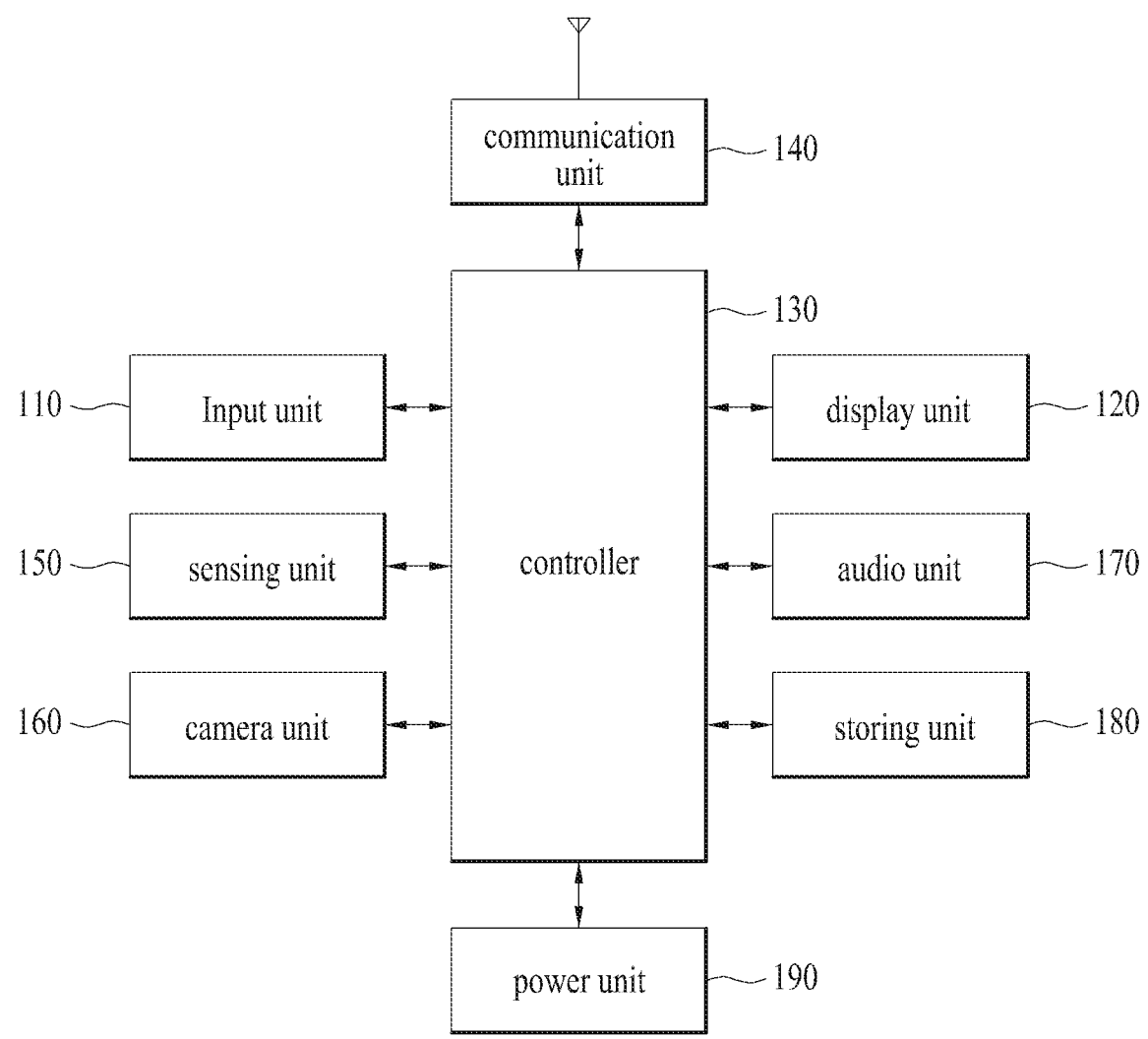
FIG. 2 is a block diagram for a terminal device according to a different embodiment.

FIG. 2 is a block diagram for a terminal device according to a different embodiment.

Referring to FIG. 2, a terminal device can include an input unit 110, a display unit 120, a controller 130, a communication unit 140, a sensing unit 150, a camera unit 160, an audio unit 170, a storing unit 180, and a power unit 190. Since the input unit 110, the display unit 120, and the controller 130 are similar to those mentioned earlier in FIG. 1, explanation on the input unit 110, the display unit 120, and the controller 130 is omitted at this time. Yet, among the implementation schemes of the input unit 110 mentioned earlier in FIG. 1, such a form as a wired/wireless communication means and the like can be included in the communication unit 140.

The communication unit 140 performs communication with the external using various protocols and transceives data with the external. The communication unit 140 accesses an external network in wired or wireless to transceive data with the external network. The communication unit 140 can receive 3D scanning information from an external device and the like.

The sensing unit 150 can forward a user input or environment recognized by a device to the controller using a sensor installed in the device. The sensing unit 150 can include a plurality of sensors. For example, a plurality of the sensors can include a gravity sensor, a terrestrial magnetism sensor, a motion sensor, a gyro sensor, an acceleration sensor, an inclination sensor, a brightness sensor, an altitude sensor, a smell sensor, a temperature sensor, a depth sensor, a pressure sensor, a bending sensor, an audio sensor, a video sensor, a GPS sensor, a touch sensor, and the like.

The terminal device can rotate or move 3D scanning information of an object, which is displayed by rotating or moving the terminal device, or a repair part using various sensors of the sensing unit 150. For example, assume that the terminal device displays the 3D scanning information of the object. If the display unit 120 of the terminal device faces upwards and is in the flat position, the controller 130 can control the display unit 120 to display the upper side of the object using a detected position and state information of the terminal device. If the terminal device moves to the right from the left while maintaining vertical state, the controller 130 can control the display unit 120 to display the side of the object from the right to the left using the detected position and the state information of the terminal device.

The camera unit 160 can perform picture and video capturing. The camera unit 160 can also be used as a motion sensor or a video sensor. The camera unit 160 can include a plurality of cameras. The camera unit 160 can capture an object. The terminal device can extract 3D scanning information using an image of the object captured by the camera unit 160. For example, if it is necessary to have an upper direction image, a bottom direction image, a front direction image, a rear direction image, a left direction image, and a right direction image to extract the 3D scanning information, the terminal device may inform a user of an image of a necessary direction. If images of all necessary directions are captured, the terminal device can extract the 3D scanning information based on the captured images.

The audio unit 170 can include an audio output means such as a speaker and the like and an audio input means such as a microphone and the like. The audio unit can also be used as an audio sensor.

The storing unit 180 can store various digital data including a video, an audio, a picture, a moving clip, an application, and the like. And, the storing unit 180 can store 3D scanning information, a repair part data, and the like. For example, the storing unit 180 can include a RAM, a ROM, a cache memory, a hard disk drive (HDD), a solid state drive (SSD), a CD, a DVD, a Blu-ray disk, a floppy disk (FDD), a magnetic disk, a memory card, a flash memory, a USB memory, and the like.

The power unit 190 corresponds to a power source connected with a battery or an external power source and can support power to a device.

As an embodiment, the terminal device can include a laptop computer, a desktop computer, a monitor, a smartphone, a tablet PC, a 3D printer, and the like.

For example, if the terminal device corresponds to a desktop computer, the terminal device receives an input of 3D scanning information of an object from an external device and may be then able to display the 3D scanning information. And, the terminal device detects a defective part from the 3D scanning information and may be able to activate a repair mode. The terminal device transmits the inputted 3D scanning information or data on a repair part to a 3D printer to print a 3D shape object.

For example, if the terminal device corresponds to a tablet PC, similar to the desktop computer, the terminal device receives an input of 3D scanning information from a different external device and may be then able to display the 3D scanning information. As a different embodiment, the terminal device can capture an object using the camera unit 160. The terminal device can extract and display the 3D scanning information using the captured image of the object. And, the terminal device detects a defective part from the 3D scanning information and may be then able to activate a repair mode. The terminal device transmits the 3D scanning information or data on a repair part to a 3D printer to print a 3D shape object.

For example, if the terminal device corresponds to a 3D printer, the terminal device can include the display unit 120. Similar to the desktop computer, the terminal receives an input of 3D scanning information from a different external device and may be then able to display the 3D scanning information. And, the terminal device detects a defective part from the 3D scanning information and may be then able to activate a repair mode. The terminal device can print a 3D shape object based on the 3D scanning information or data on a repair part. In particular, the terminal device can further include an output unit (not depicted) configured to output a 3D shape of a repair part generated by the controller 130. Meanwhile, the output unit equipped with a plurality of nozzles may output various materials or various adhesive materials.

So far, a block diagram of a terminal device has been explained. In the following, a repair mode is explained.

FIG. 3 is a diagram for explaining a repair mode according to one embodiment.

Referring to FIG. 3 (1), it shows 3D scanning information 10 of an object. The 3D scanning information 10 of the object includes a defective part 11. The defective part 11 corresponds to a damaged part of the object. If a terminal device recognizes the defective part, the terminal device can activate a repair mode. The repair mode corresponds to a mode for displaying 3D information of a repair part corresponding to the defective part 11 and supporting a 3D printer to print the repair part in 3D shape based on the 3D information of the repair part.

The terminal device can generate a repair part by activating a repair mode. For example, the terminal device can extract information such as a position, a size, a shape, and the like of a defective part based on 3D scanning information. The terminal can generate the repair part based on the extracted information on the position, the size, and the shape of the defective part. Or, the terminal device can anticipate 3D information of an object of a perfect shape based on the 3D scanning information. The terminal device can generate a repair part by comparing or calculating information of an anticipated 3D object of a perfect shape and information of a scanned object with each other.

Referring to FIG. 3 (2), it shows a repair part 13. The repair part 13 corresponds to a defective part of object scanning information. In particular, the repair part 13 corresponds to a part capable of being perfectly matched with the defective part. The repair part 13 can be classified into a coupling area 13*a* and a non-coupling area 13*b*. The coupling area 13*a* corresponds to a boundary area contacted with the defective part of a 3D shape of the object. The non-coupling area 13*b* corresponds to a partial area of an internal or external surface of the 3D shape of the object. If the repair part 13 is matched with the defective part of the object, the coupling area 13*a* is not exposed to the external, whereas and the non-coupling area 13*b* is exposed to the external only. In particular, the non-coupling area 13 corresponds to an area of the object exposed to the external and the coupling area 13*a* corresponds to an area contacted and engaged with an area of the defective part of the object.

Since the coupling area 13*a* corresponds to an area engaged with the defective part of the 3D shape of the object, adhesive can be applied to the coupling area 13*a*. By doing so, the repair part 13 can be strongly fixed with the defective part of the 3D shape of the object.

The repair part 13 can be generated in various shapes and sizes. Hence, the terminal device can generate a protrusion on the repair part 13 to easily handle the repair part 13 or easily combine the repair part with the 3D shape of the object.

Figure 4:
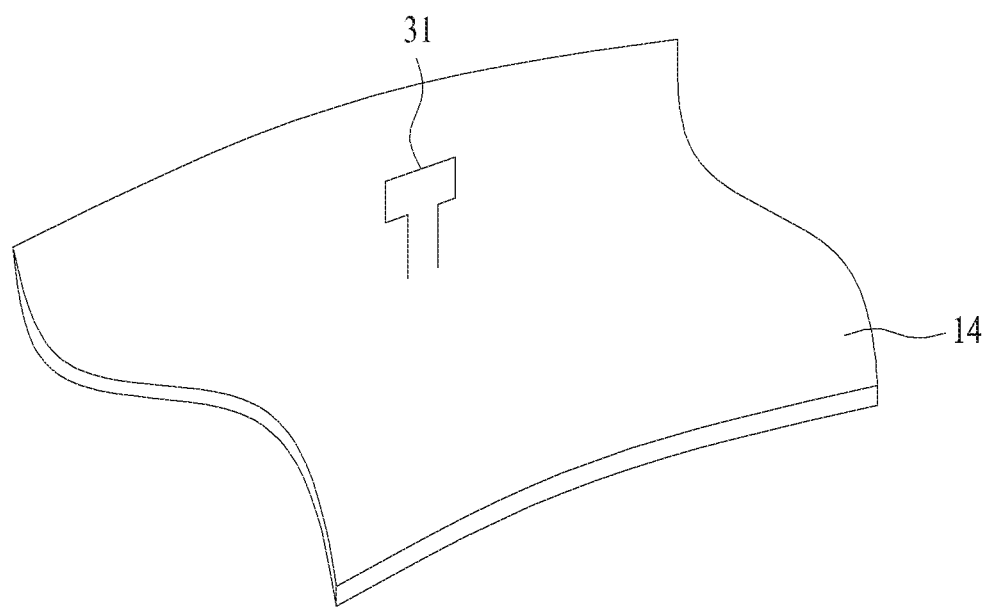
FIG. 4 is a diagram for explaining one embodiment of generating a protrusion in a repair part.

FIG. 4 is a diagram for explaining one embodiment of generating a protrusion in a repair part.

Referring to FIG. 4, it shows a protrusion 31 generated in a repair part 14. In FIG. 4, the repair part 14 may correspond to a repair part including the protrusion 31 which is displayed by the display unit in the repair mode of the terminal device. Or, the repair part 14 may correspond to a repair part including the protrusion 31 printed by a 3D printer.

If a predetermined condition is satisfied, the terminal device can generate a detachable protrusion 31 in a non-coupling area. The predetermined condition may correspond to at least one selected from the group consisting of a condition that a volume of the repair part 14 is equal to or less than a predetermined volume, a condition that a volume of the repair part 14 is equal to or greater than a predetermined volume, a condition that a bending radius of the repair part 14 is equal to or greater than a predetermined size, and a condition that a thickness of the repair part 14 is equal to less than a predetermined size.

If a volume of the repair part 14 is equal to or less than a predetermined volume or if a thickness of the repair part 14 is equal to or less than a predetermined size, it may be difficult for a user to combine the repair part 14 with the defective part of the 3D object. Hence, if the volume of the repair part 14 is equal to or less than the predetermined volume or if the thickness of the repair part 14 is equal to or less than the predetermined size, the terminal device can generate a protrusion 31. The predetermined volume or thickness can be configured by a specific value.

Meanwhile, if the volume of the repair part 14 is equal to or greater than the predetermined volume or if a bending radius of the repair part 14 is equal to or greater than a predetermined size, a user may easily hold the repair part 14 by hand. However, depending on a shape of the 3D object, it may be difficult for the user to combine the repair part 14 with the defective part of the 3D object. Hence, if the volume of the repair part 14 is equal to or greater than the predetermined volume or if the bending radius of the repair part 14 is equal to or greater than the predetermined size, the terminal device can generate a protrusion 31. The protrusion 31 can be generated in various shapes and numbers. For example, the protrusion 31 can be generated in a form of a polygon including a quadrangle, a circle, an oval, or a ring.

Figure 5:
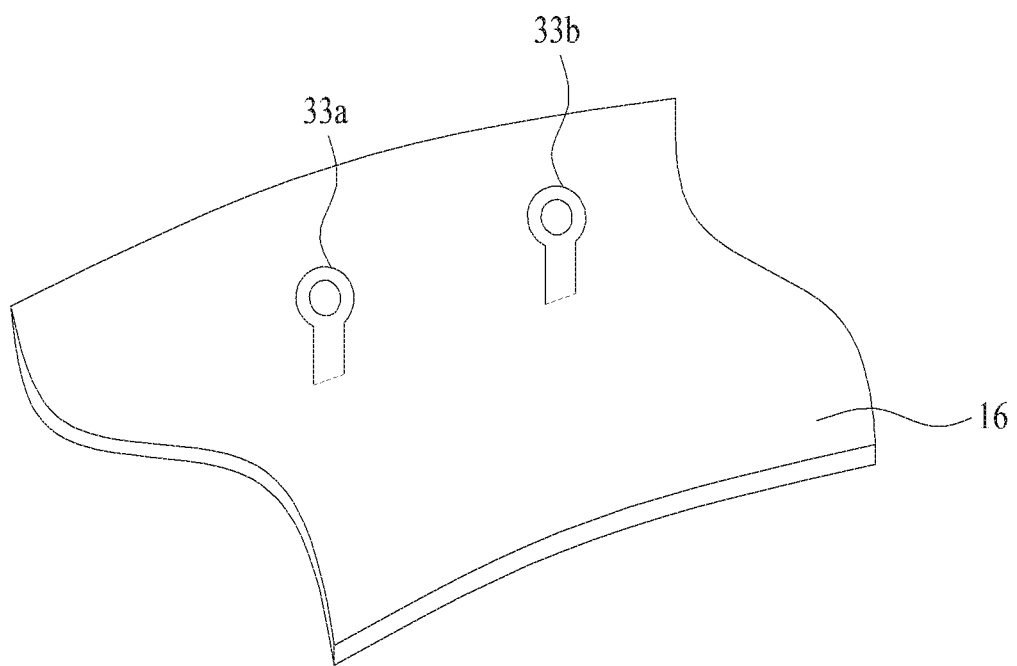
FIG. 5 is a diagram for explaining one embodiment of generating a plurality of protrusions.

FIG. 5 is a diagram for explaining one embodiment of generating a plurality of protrusions.

Referring to FIG. 5, it shows a repair part 16 including two protrusions 33a/33b.

If a volume of the repair part 16 is equal to or greater than a predetermined volume or if the area of the repair part 16 is equal to or greater than the predetermined area, it may be inconvenient for a user to hold the repair part 16 by one hand. Or, when a user combines the repair part 16 with the defective part of the 3D object, it may be inconvenient for the user to handle the repair part 16 by one hand. Hence, if the volume of the repair part 16 is equal to or greater than the predetermined volume or if the area of the repair part 16 is equal to or greater than the predetermined area, the terminal device can generate a plurality of protrusions 33a/33b. For example, it may be able to generate two protrusions 33a/33b in the repair part 16. As mentioned in the foregoing description, the protrusions 33a/33b can be generated in a non-coupling area of the repair part.

If two protrusions 33a/33b are generated in the repair part 16, a user can combine the repair part with the defective area of the 3D object by holding the two protrusions 33a/33b. Hence, the two protrusions can be generated while maintaining a prescribed distance between the protrusions. It may be able to generate two or more protrusions. A plurality of protrusions may mutually maintain a predetermined distance. The terminal device may generate a protrusion per a prescribed distance. As an embodiment, when the terminal device is configured to generate a protrusion per 5 cm, if a length of one side of a repair part is longer than 5 cm, it is able to configure the terminal device to generate two protrusions. If a length of one side of a repair part is longer than 10 cm, it is able to configure the terminal device to generate three protrusions. Or, if a repair part including a protrusion is displayed on the display unit, a position and the number of protrusions can be adjusted according to a user configuration.

Meanwhile, in case of the repair part 16 shown in FIG. 5, if a size of one side of a non-coupling area is equal to or greater than a predetermined size, the terminal device can determine the one side of the non-coupling area as a position in which a protrusion is generated. When the terminal device determines one side of a non-coupling area as a position in which a protrusion is generated, the terminal device may checks whether or not the side is exposed to the external. For example, when both a front side and a rear side of a repair part are equal to or greater than a predetermined size, the terminal device can determine which side is exposed to the external among the front side and the rear side with reference to 3D scanning information of an object. If the front side corresponds to a side exposed to the external, the terminal device can generate a protrusion in the front side. And, the terminal device can determine a vertical direction of one side of a non-coupling area as a direction for which a protrusion is generated.

A size of a protrusion can be determined based on a predetermined size irrespective of a size of a repair part. In particular, although a size of a repair part is big or small, a protrusion can be generated by a predetermined size. And, a protrusion can be generated in various shape. FIG. 5 shows protrusions 33a/33b of a ring form as an embodiment. A protrusion can be generated in a non-coupling area of a repair part. And, a direction and a position of the protrusion can be determined according to an optimal condition.

FIG. 6 is a diagram for explaining one embodiment of configuring a direction of a protrusion.

Referring to FIG. 6 (1), it shows a repair part 18. A terminal device can generate the repair part 18 by activating a repair mode. The terminal device can determine whether or not a size, a shape, and the like of the repair part 18 satisfy a condition for generating a protrusion. If it is determined that the size, the shape, and the like of the repair part 18 satisfy the condition for generating a protrusion, the terminal device can generate the protrusion.

Referring to FIG. 6 (2), it shows a procedure of extracting a feature point and a feature side and detecting a vertical line.

The terminal device can extract a feature point 51 of a coupling area. The feature point 51 corresponds to a point such as an edge of a prescribed area. The terminal device extracts the feature point from an image or three dimensional shape information and may be able to determine a shape, area, and the like of a corresponding area. The terminal device connects extracted feature points with each other to detect at least one feature side 53. The feature side 53 corresponds to a side generated by connecting the feature points with each other. The terminal device can detect a vertical line 55 of the at least one detected feature side 53. For example, if there are 5 feature sides 53, it may be able to detect 5 vertical lines 55. The terminal device can detect an average direction of the detected vertical lines.

Referring to FIG. 6 (3), it shows a procedure of determining a position and a direction of a protrusion.

The terminal device can determine a point at which an average direction 57 of the detected vertical lines and a non-coupling area are met as a position in which a protrusion 35 is generated. And, the terminal device can determine the average direction 57 of the detected vertical lines as a direction for which the protrusion 35 is generated.

The terminal device can determine a direction of a protrusion using a different scheme.

Figure 7:
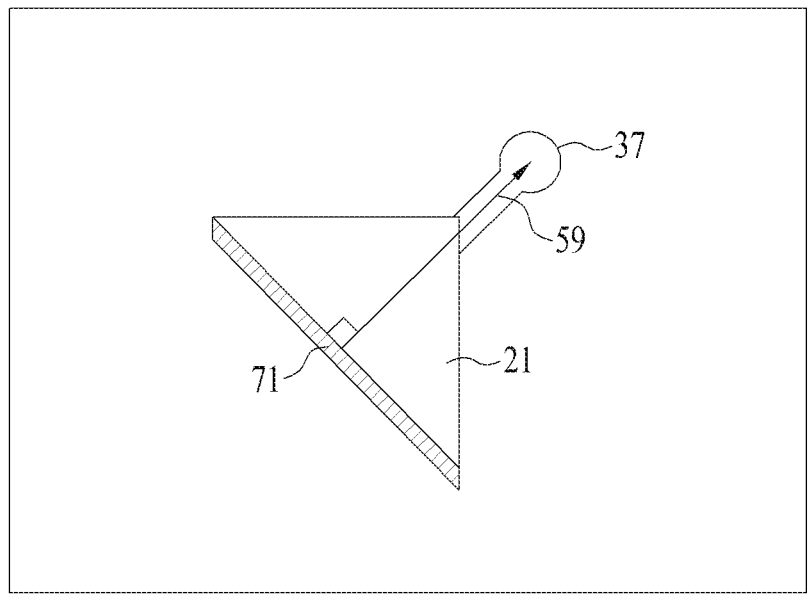
FIG. 7 is a diagram for explaining a different embodiment of configuring a direction of a protrusion.

FIG. 7 is a diagram for explaining a different embodiment of configuring a direction of a protrusion.

Referring to FIG. 7, it shows a repair part 21. The repair part 21 can include a coupling area 71 equal to or greater than a predetermined area. The repair part 21 may include a single coupling area only. Or, although the repair part 21 includes another coupling area, if an area of one coupling area is greater than an area of another coupling area more than a predetermined area, the another coupling area can be ignored when a direction of a protrusion is determined. In order to bond a coupling area to a defective part of an object, it may be able to generate an adhesive application area.

The terminal device can extract a vertical line 59 orthogonal to a coupling area 71 which is equal to or greater than a predetermined area. The terminal device can calculate a point at which the extracted vertical line 59 and a boundary line of a non-coupling area are met. The terminal device determines a direction of the extracted vertical line 59 as a direction of a protrusion 37 and may be able to determine the point at which the vertical line 59 and the boundary line of the non-coupling area are met as a positon of the protrusion 37.

In this case, since the protrusion 37 is orthogonal to the coupling area 71, a user can conveniently and efficiently combine the repair part 21 with the defective part of the 3D object.

Figure 8:
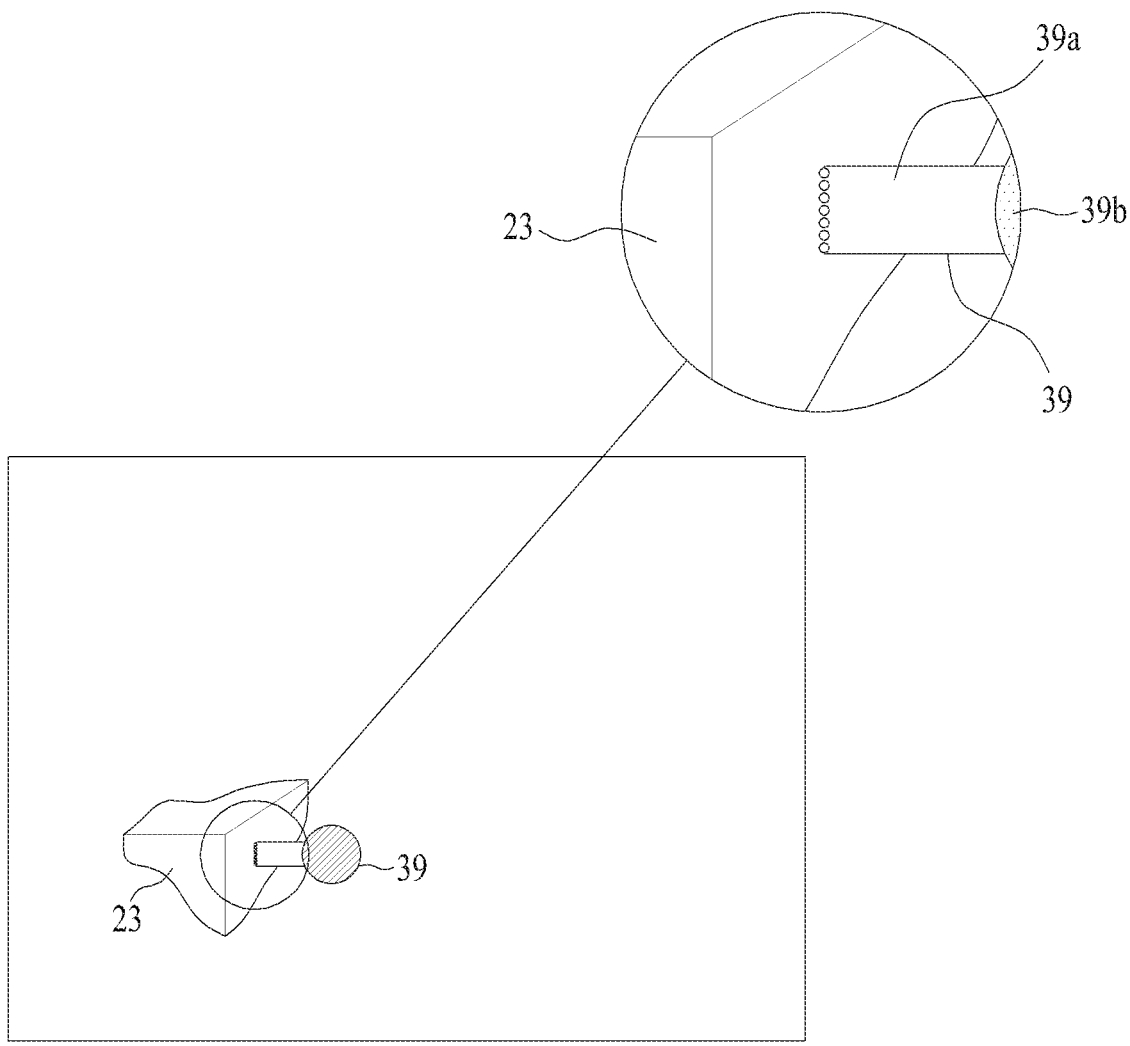
FIG. 8 is a diagram for explaining one embodiment of a connection part between a repair part and a protrusion.

FIG. 8 is a diagram for explaining one embodiment of a connection part between a repair part and a protrusion.

Referring to FIG. 8, it shows a repair part 23 and a protrusion 39. Referring to a drawing in which the repair part 23 and the protrusion 38 are magnified, the protrusion 39 can include a connection part 39a and a handle part 39b. The connection part 39a corresponds to a part for connecting the repair part 23 with the handle part 39b of the protrusion 39. The handle part 39b corresponds to a part capable of being held by a hand of a user.

Bore-hole treatment can be performed on an area at which the connection part 39a and the repair part 23 are connected to make the connection part to be easily separated from the repair part. Hence, when the protrusion 39 is eliminated by a user, the protrusion 39 can be easily and completely eliminated along with the connection part 39a on which the bore-hole treatment is performed. The connection part 39a can be generated with a prescribed size.

One end of the connection part 39 is connected with the handle part 39b. The connection part 39a and the handle part 39b can be generated as a unibody. The handle part 39b can be generated in various shapes. For example, the handle part can be generated in a form of a polygon including a quadrangle, a circle, or a ring. A non-skid treatment can be performed on a surface of the handle part 39b to prevent sliding. For example, the non-skid treatment performed on the surface of the handle part 39b can include a wave-like pattern treatment, abrasion treatment, heterogeneous particle application treatment, and the like. The abrasion treatment corresponds to a treatment of carving a random point of a surface of the handle part 39b or a treatment of scratching the surface of the handle part 39b. The heterogeneous particle application treatment corresponds to a treatment of additionally applying a fine particle to the handle part 39b. If the non-skid treatment is performed on the handle part 39b, since friction force increases, a user can stably hold the handle part.

Meanwhile, when the terminal device displays the repair part 23 and the protrusion 39 on a display device, the terminal device can display a menu capable of selecting a size, a material, and the like of the connection part 39a and the handle part 39b on the display device. The terminal device can forward information on the selected size and the material of the protrusion 39 to a printing device.

Figure 9:
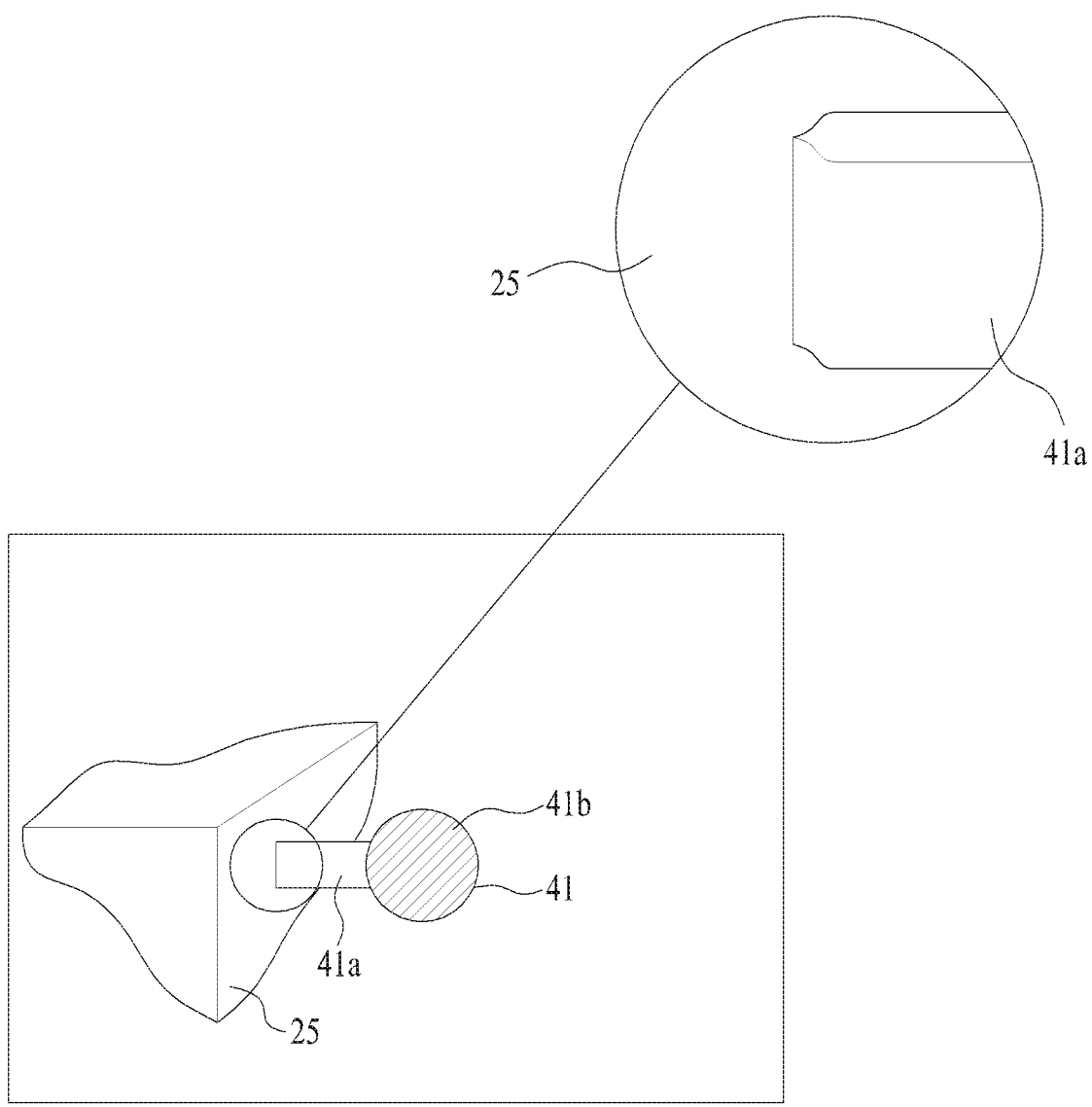
FIG. 9 is diagram for explaining a different embodiment of a connection part between a repair part and a protrusion.

FIG. 9 is diagram for explaining a different embodiment of a connection part between a repair part and a protrusion.

Referring to FIG. 9, it shows a repair part 25 and a protrusion 41. The protrusion 41 can include a connection part 41a and a handle part 41b. As shown in FIG. 8, although the repair part 25 may have a volume equal to or less than a prescribed size, the repair part may also have a volume equal to or greater than the prescribed size. The protrusion corresponds to a temporary handle capable of being held by a user. An object of generating the protrusion is to overcome the difficulty of holding the repair part by a hand and the difficulty of combining the repair part with a defective part of a 3D object. Hence, when whether to generate the protrusion is determined, it is important to consider whether or not it is difficult to handle the repair part 25. And, if the repair part is combined with the defective part of the 3D object, the protrusion should be eliminated.

Referring to the drawing that the connection part 41a is magnified, in order to make an area connected with the repair part 25 to be easily separated from the repair part, it may implement the area with thickness thinner than thickness of other areas of the connection part 41a. Hence, when the protrusion is eliminated by a user, the protrusion 41 can be easily and completely removed from the repair part among with the connection part 41a implemented by the thin thickness.

One end of the connection part 41a is connected with the handle part 41b. The connection part and the handle part 41n can be generated as a unibody. In order to prevent skidding, a non-skid treatment can be performed on a surface of the handle part 41b. For example, For example, the non-skid treatment performed on the surface of the handle part 39b can include a wave-like pattern treatment, abrasion treatment, heterogeneous particle application treatment, and the like. If the non-skid treatment is performed on handle part 41b, since friction force increases, a user can stably hold the handle part.

Meanwhile, when the terminal device displays the repair part 25 and the protrusion 41 on a display device, the terminal device can display a menu capable of selecting a size, a material, and the like of the connection part 41a and the handle part 41b on the display device. The terminal device can forward information on the selected size and the material of the protrusion 41 to a printing device.

In order to make a repair part to be combined with a defective part of an object, it may apply adhesive to a coupling area.

Figure 10:
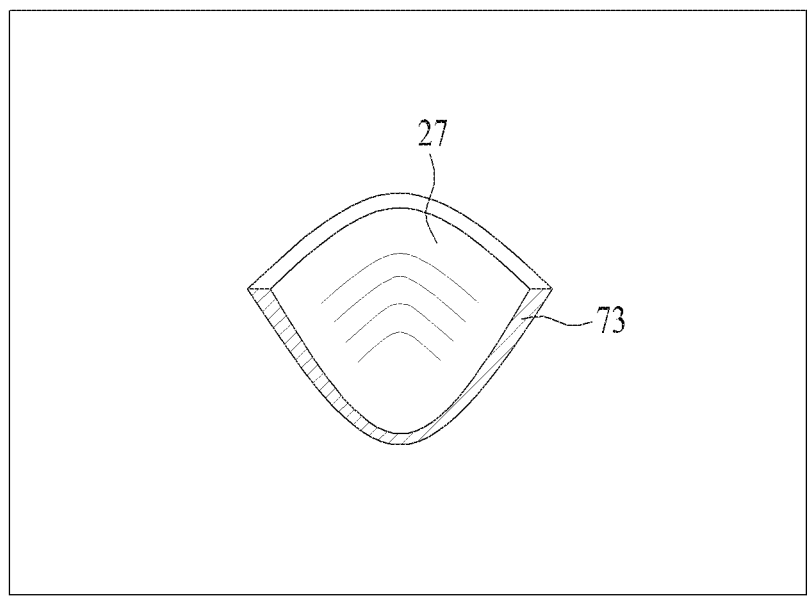
FIG. 10 is a diagram for explaining one embodiment of applying an adhesive material.

FIG. 10 is a diagram for explaining one embodiment of applying an adhesive material.

Referring to FIG. 10, it shows a repair part 27. The repair part 27 includes a coupling area 73. The coupling area corresponds to an area contacted with a defective part of a 3D object. A terminal device can generate an adhesive application area in the coupling area 73. If the terminal device forwards data of the repair part 27 including the adhesive application area to a 3D printer device, the 3D printer device can apply adhesive to the adhesive application area of the repair part 27.

The terminal device not only generates the adhesive application area but also selects a type of adhesive. Although the terminal device may select one adhesive, the terminal device may change a type of adhesive depending on a material of a repair part. For example, if the material of the repair part 27 corresponds to paper, the adhesive may correspond to paste. If the material of the repair part 27 corresponds to synthetic resins, the adhesive may correspond to glue.

As mentioned above, the terminal device can forward information on the generated adhesive application area and information on the adhesive to a 3D printer device. However, if the 3D printer device does not support an adhesive application function or a specific adhesive type, the terminal device may not forward the information on the adhesive to the 3D printer device. Or, the terminal device may select an adhesive type capable of being supported by the 3D printer device and forward information on the selected adhesive type to the 3D printer device.

The terminal device generates a repair part, a protrusion, and an adhesive application area and forwards information on the repair part, the protrusion, and the adhesive application area to a 3D printer device. In the following, an operation procedure between an external terminal device and a 3D printer device is explained.

FIG. 11 is a flowchart for explaining a procedure of transmitting and receiving data between an external terminal device and a 3D printer according to one embodiment.

Referring to FIG. 11, it shows a terminal device 100a and a 3D printer 100b. The terminal device 100a receives an input of 3D scanning information of an object and may be able to display the 3D scanning information [S1110]. The terminal device 100a can receive the input of the 3D scanning information of the object from an external device using a wired/wireless communication scheme. Alternately, the terminal device 100a can read 3D scanning information of an object stored in an external storing device using an external input terminal. If the terminal device 100a includes a camera unit, the terminal device 100a captures an object in various directions and may be able to extract 3D scanning information of the object using the captured images.

The terminal device 100a detects a defective part from the 3D scanning information and may be able to activate a repair mode [S1120]. If a defective part is detected, the terminal device 100a may directly enter the repair mode or may inquire of a user about whether to enter the repair mode.

The terminal device 100a can generate a repair part corresponding to the defective part based on the 3D scanning information [S1130]. The repair part can be classified into a coupling area and a non-coupling area.

If a predetermined condition is satisfied, the terminal device 100a can generate a detachable protrusion in the non-coupling area [S1140]. The predetermined condition may correspond to one selected from the group consisting of a condition that a volume of a repair part is equal to or less than a predetermined volume, a condition that a volume of a repair part is equal to or greater than a predetermined volume, a condition that a bending radius of a repair part is equal to or greater than a predetermined size, a condition that a thickness of a repair part is equal to less than a predetermined size, and the like. Or, a plurality of conditions can be configured as a condition for generating a protrusion.

The terminal device 100a analyzes information of the repair part and compares the information with a predetermined condition to determine whether to generate a protrusion. And, the terminal device 100a can generate an adhesive application area in the defective part of the repair part and can select an adhesive type based on a material of the repair part.

The terminal device 100a can transmit information on the generated repair part to a 3D printer 100b [S1150]. The 3D printer 100b can output a 3D shape based on the information on the repair part received from the terminal device 100a [S1160].

FIG. 12 is a flowchart for a method of controlling a terminal device according to one embodiment.

Referring to FIG. 12, a terminal device can receive an input of 3D scanning information of an object [S1210]. The 3D scanning information of the object can be received from an external device. And, images of the object can be captured using a camera of the terminal device and the 3D scanning information can be extracted from the captured images.

The terminal device can display the 3D scanning information [S1220]. The terminal device can detect a defective part from the 3D scanning information [S1230]. If the defective part is detected, the terminal device activates a repair mode and may be able to generate a repair part corresponding to the defective part based on the 3D scanning information [S1240]. The repair part can be classified into a coupling area and a non-coupling area.

If a predetermined condition is satisfied, the terminal device can generate a detachable protrusion in the non-coupling area [S1250]. The terminal device can determine a direction and a position of the protrusion based on information on the coupling area. Or, the direction and the position of the protrusion can be determined by a selection of a user.

As mentioned in the foregoing description, the terminal device 100a can include a laptop computer, a desktop computer, a smartphone, a tablet PC, a 3D printer, and the like. If the terminal device 100a corresponds to a device separated from the 3D printer, the terminal device 100a can transmit information on a repair part, a protrusion, and the like to the 3D printer. The 3D printer can print a 3D shape based on the information received from the terminal device. If the terminal device 100a corresponds to the 3D printer, the terminal device 100a can forward information on a generated repair part, a protrusion, and the like to an output unit. The output unit can print a 3D shape based on the information received from the terminal device.

A terminal device, a system including the terminal device, and a method of controlling the terminal device according to the present specification are not restrictively applied to the configuration and action of the aforementioned embodiments. Instead, it may be able to have various modifications in a manner that all or a part of the embodiments are selectively combined.

Meanwhile, the method of controlling the terminal device according to the present specification can be implemented with software in a recording media readable by a processor. The examples of the recording media readable by the processor may include a ROM, a RAM, a CD-ROM, a magnetic tape, a floppy disc, an optical data storing device and the like. And, implementing in a form of a carrier wave (e.g., transmission via the internet and the like) is also included. The recording media readable by the processor are distributed to computer systems connected via a network and a code readable by the processor can be stored and executed according to a distribution scheme.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

MODE FOR INVENTION

Industrial Applicability

The present invention is usable in a terminal device and is available in the industry having possibility of repetition.

What is claimed is:

1. A terminal device, comprising:
an input unit configured to receive an input of 3D scanning information of an object;
a display unit configured to display the 3D scanning information; and
a controller configured to detect a defective part from the 3D scanning information, the controller, if the defective part is detected, configured to activate a repair mode, the controller configured to generate a repair part corresponding to the defective part based on the 3D scanning information, wherein the repair part is classified into a coupling area and a non-coupling area, the controller, if a predetermined condition is satisfied, configured to generate a detachable protrusion in the non-coupling area.

2. The terminal device of claim 1, wherein the predetermined condition corresponds to at least one selected from the group consisting of a condition that a volume of the repair part is equal to or less than a predetermined volume, a condition that the volume of the repair part is equal to or greater than the predetermined volume, a condition that a bending radius of the repair part is equal to or greater than a predetermined size, and a condition that a thickness of the repair part is equal to less than a predetermined size.

3. The terminal device of claim 2, wherein if the volume of the repair part is equal to or greater than the predetermined volume, the controller is configured to generate a plurality of protrusions.

4. The terminal device of claim 3, wherein a plurality of the protrusions maintain a predetermined distance among a plurality of the protrusions.

5. The terminal device of claim 1, wherein the non-coupling area corresponds to an area of the object exposed to the external.

6. The terminal device of claim 1, wherein the coupling area corresponds to an area contacted and engaged with one area of the defective area of the object.

7. The terminal device of claim 1, wherein the controller is configured to generate an adhesive application area in the coupling area.

8. The terminal device of claim 7, wherein the controller is configured to change a type of adhesive depending on a material of the repair part.

9. The terminal device of claim 1, wherein the controller is configured to detect at least one or more feature sides in a manner of detecting feature points and connecting the feature points with each other, detect vertical lines of the at least one or more feature sides, detect an average direction of the at least one or more detected vertical lines, and determine a point at which the detected average direction and the non-coupling area are met as a position at which the protrusion is generated.

10. The terminal device of claim 9, wherein the controller is configured to determine the detected average direction as a direction for which the protrusion is generated.

11. The terminal device of claim 1, wherein if one side of the non-coupling area is equal to or greater than a predetermined size, the controller is configured to determine the one side of the non-coupling area as a position at which the protrusion is generated.

12. The terminal device of claim 11, wherein the controller is configured to determine a vertical direction of the one side of the non-coupling area as a direction for which the protrusion is generated.

13. The terminal device of claim 1, wherein the controller is configured to generate the protrusion with a predetermined size irrespective of a size of the repair part.

14. The terminal device of claim 1, wherein the protrusion comprises a connection part and a handle part.

15. The terminal device of claim 14, wherein the connection part is connected with the handle part and the repair part and wherein an area of the connection part connected with the repair part is processed by bore-hole treatment or a thickness thinner than a thickness of other area of the connection part to make the connection part to be easily separated from the repair part.

16. The terminal device of claim 14, wherein the handle part is generated in a ring shape or is processed by a non-skid treatment.

17. The terminal device of claim 16, wherein the non-skid treatment comprises at least one selected from the group consisting of a pattern treatment, an abrasion treatment, and a heterogeneous particle application treatment.

18. The terminal device of claim 1, further comprising an output unit configured to output a three dimensional shape of the repair part generated by the controller.

* * * * *